US005956157A

United States Patent [19]
Tai

[11] Patent Number: 5,956,157
[45] Date of Patent: Sep. 21, 1999

[54] METHOD AND APPARATUS FOR LOCALLY BLENDING GRAY DOT TYPES OF THE SAME OR DIFFERENT TYPES TO REPRODUCE AN IMAGE WITH GRAY LEVEL PRINTING

[75] Inventor: Hwai-Tzuu Tai, Rochester, N.Y.

[73] Assignee: Eastman Kodak Company, Rochester, N.Y.

[21] Appl. No.: 08/353,644

[22] Filed: Dec. 8, 1994

[51] Int. Cl.⁶ ...................................................... H04N 1/40
[52] U.S. Cl. .......................... 358/455; 358/457; 358/458; 358/459; 358/465
[58] Field of Search ..................................... 358/455, 456, 358/457, 458, 459, 465, 466, 470, 448

[56] References Cited

U.S. PATENT DOCUMENTS

| | | | |
|---|---|---|---|
| 4,633,327 | 12/1986 | Roetling | 358/455 |
| 4,698,688 | 10/1987 | Ochi et al. | 358/470 |
| 4,701,806 | 10/1987 | Takashima | 358/466 |
| 5,200,831 | 4/1993 | Tai . | |
| 5,258,850 | 11/1993 | Tai . | |
| 5,300,960 | 4/1994 | Pham et al. . | |

*Primary Examiner*—Thomas D. Lee
*Attorney, Agent, or Firm*—Norman Rushefsky

[57] ABSTRACT

A method and apparatus for reproducing an original image includes a scanner or other image source for generating digitized raw image data for each pixel of an image. For each pixel, the raw image data is transformed into a rendering gray level value by comparing the raw image data value with threshold values from a threshold mask set. There are various threshold mask sets that may be used in accordance with a dot type that is selected based on a calculated local contrast index. The dot type being either a mixed dot type or one of a fixed threshold or a partial dot type. A printer or display is controlled to print the digitized image signal by rendering the dot regions in accordance with the selected dot type for each dot region, so that an original image that may contain different types of image regions is satisfactorily reproduced. In regions at the boundaries of two different dot regions a process of blending of the different rendering processes for the two regions is used to reduce the appearance of sharp changes between regions.

30 Claims, 22 Drawing Sheets

LEVEL 1

```
30
 \
43 | 36  22 | 8
15 | ①   29| 50
22 | 8   43| 36
29 | 50  15 | 1
```

LEVEL 5

```
47  40  26  12
19   5  33  54
26  12  47  40
33  54  19   5
```

LEVEL 2

```
44  37  23   9
16   2  30  51
23   9  44  37
30  51  16   2
```

LEVEL 6

```
48  41  27  13
20   6  34  55
27  13  48  41
34  55  20   6
```

LEVEL 3

```
45  38  24  10
17   3  31  52
24  10  45  38
31  52  17   3
```

LEVEL 7

```
49  42  28  14
21   7  35  56
28  14  49  42
35  56  21   7
```

LEVEL 4

LEVEL 1

```
  34
      6   4   2
  7 ┌───┬───┐
  3 │ ① │ 5 │ 8
  4 │ 2 │ 7 │ 6
  5 └───┴───┘
      8   3   1
```

LEVEL 2

```
  15 │ 14 │ 12 │ 10
  ┌──┼────┼──┐
  │11│  9 │13│ 16
  │12│ 10 │15│ 14
  └──┴────┴──┘
  13 │ 16 │ 11 │  9
```

LEVEL 3

23  22  20  18
19  17  21  24
20  18  23  22
21  24  19  17

LEVEL 4

31  30  28  26
27  25  29  32
28  26  31  30
29  32  27  25

LEVEL 5

39  38  36  34
35  33  37  40
36  34  39  38
37  40  35  33

LEVEL 6

47  46  44  42
43  41  45  48
44  42  47  46
45  48  43  41

LEVEL 7

LEVEL 1

```
  36
   \
 31 | 26 | 16    6
 11 | ①  | 21   36
 16 | 6  | 31   26
 21 | 36 | 11    1
```

LEVEL 2

```
32  27  17   7
12   2  22  37
17   7  32  27
22  37  12   2
```

LEVEL 3

```
33  28  18   8
13   3  23  38
18   8  33  28
23  38  13   3
```

LEVEL 4

```
34  29  19   9
14   4  24  39
19   9  34  29
24  39  14   4
```

LEVEL 5

```
35  30  20  10
15   5  25  40
20  10  35  30
25  40  15   5
```

LEVEL 6

```
47  46  44  42
43  41  45  48
44  42  47  46
45  48  43  41
```

LEVEL 7

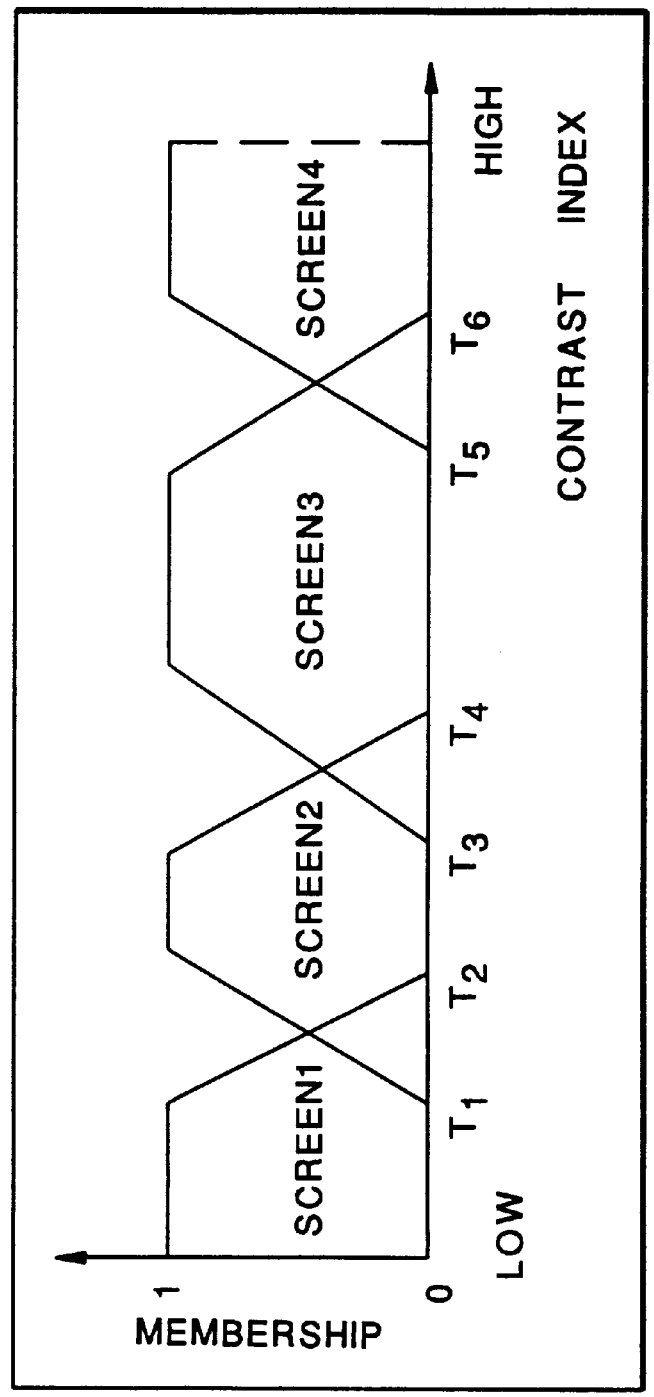

```
LEVEL 1            LEVEL 2              LEVEL 3              LEVEL 4              LEVEL 5              LEVEL 6
53 130 155  79     55 132 157  81       57 134 159  83       60 136 162  85       62 138 164  87       64 140 166  89
181  28   2 104    183  30   4 106      185  32   6 108      187  34   9 111      189  36  11 113      191  38  13 115
155  79  53 130    157  81  55 132      159  83  57 134      162  85  60 136      164  87  62 138      166  89  64 140
  2 104 181  28      4 106 183  30        6 108 185  32        9 111 187  34       11 113 189  36       13 115 191  38

LEVEL 7            LEVEL 8              LEVEL 9              LEVEL 10             LEVEL 11             LEVEL 12
66 142 168  91     68 145 170  94       70 147 172  96       72 149 174  98       74 151 176 100       77 153 179 102
193  40  15 117    196  43  17 119      198  45  19 121      200  47  21 123      202  49  23 125      204  51  26 128
168  91  66 142    170  94  68 145      172  96  70 147      174  98  72 149      176 100  74 151      179 102  77 153
 15 117 193  40     17 119 196  43       19 121 198  45       21 123 200  47       23 125 202  49       26 128 204  51

LEVEL 13           LEVEL 14             LEVEL 15
210 217 219 213    227 234 236 230      244 251 253 247
221 208 206 215    238 225 223 232      255 242 240 249
219 213 210 217    236 230 227 234      253 247 244 251
206 215 221 208    223 232 238 225      240 249 255 242
```

FIG. 10A

```
LEVEL 1 STRUCTURE         LEVEL 2 STRUCTURE
25  61  73  37            26  62  74  38
85  13   1  49            86  14   2  50
73  37  25  61            74  38  26  62
 1  49  85  13             2  50  86  14
```

FIG. 10B

```
LEVEL 1        LEVEL 2        LEVEL 3         LEVEL 4         LEVEL 5         LEVEL 6
15 79 66 40    17 81 68 43    19 83 70 45     21 85 72 47     23 87 74 49     26 89 77 51
91 28  2 53    94 30  4 55    96 32  6 57     98 34  9 60     100 36 11 62    102 38 13 64
66 40 15 79    68 43 17 81    70 45 19 83     72 47 21 85     74 49 23 87     77 51 26 89
 2 53 91 28     4 55 94 30     6 57 96 32      9 60 98 34     11 62 100 36    13 64 102 38

LEVEL 7              LEVEL 8              LEVEL 9              LEVEL 10             LEVEL 11             LEVEL 12
106 117 115 111      123 134 132 128      140 151 149 145      157 168 166 162      174 185 183 179      191 202 200 196
119 108 104 113      136 125 121 130      153 142 138 147      170 159 155 164      187 176 172 181      204 193 189 198
115 111 106 117      132 128 123 134      149 145 140 151      166 162 157 168      183 179 174 185      200 196 191 202
104 113 119 108      121 130 136 125      138 147 153 142      155 164 170 159      172 181 187 176      189 198 204 193

LEVEL 13             LEVEL 14             LEVEL 15
208 219 217 213      225 236 234 230      242 253 251 247
221 210 206 215      238 227 223 232      255 244 240 249
217 213 208 219      234 230 225 236      251 247 242 253
206 215 221 210      223 232 238 227      240 249 255 244
```

FIG. 11

| LEVEL 1 | LEVEL 2 | LEVEL 3 | LEVEL 4 | LEVEL 5 | LEVEL 6 |
|---|---|---|---|---|---|
| 17 15 11 13 | 34 32 28 30 | 51 49 45 47 | 68 66 61 64 | 85 83 78 81 | 102 100 95 98 |
| 6 2 4 8 | 23 19 21 25 | 40 36 38 42 | 57 53 55 59 | 74 70 72 76 | 91 87 89 93 |
| 11 13 17 15 | 28 30 34 32 | 45 47 51 49 | 61 64 68 66 | 78 81 85 83 | 95 98 102 100 |
| 4 8 6 2 | 21 25 23 19 | 38 42 40 36 | 55 59 57 53 | 72 76 74 70 | 89 93 91 87 |

| LEVEL 7 | LEVEL 8 | LEVEL 9 | LEVEL 10 | LEVEL 11 | LEVEL 12 |
|---|---|---|---|---|---|
| 119 117 112 114 | 136 134 129 131 | 153 151 146 148 | 170 167 163 165 | 187 184 180 182 | 204 201 197 199 |
| 108 104 106 110 | 125 121 123 127 | 142 138 140 144 | 159 155 157 161 | 176 172 174 178 | 193 189 191 195 |
| 112 114 119 117 | 129 131 136 134 | 146 148 153 151 | 163 165 170 167 | 180 182 187 184 | 197 199 204 201 |
| 106 110 108 104 | 123 127 125 121 | 140 144 142 138 | 157 161 159 155 | 174 178 176 172 | 191 195 193 189 |

| LEVEL 13 | LEVEL 14 | LEVEL 15 |
|---|---|---|
| 220 218 214 216 | 237 235 231 233 | 254 252 248 250 |
| 210 206 208 212 | 227 223 225 224 | 244 240 242 246 |
| 214 216 220 218 | 231 233 237 235 | 248 250 254 252 |
| 208 212 210 206 | 225 229 227 223 | 242 246 244 240 |

FIG. 12

| LEVEL 1 | LEVEL 2 | LEVEL 3 | LEVEL 4 | LEVEL 5 | LEVEL 6 |
|---|---|---|---|---|---|
| 16 16 16 16 | 32 32 32 32 | 48 48 48 48 | 64 64 64 64 | 80 80 80 80 | 96 96 96 96 |
| 16 16 16 16 | 32 32 32 32 | 48 48 48 48 | 64 64 64 64 | 80 80 80 80 | 96 96 96 96 |
| 16 16 16 16 | 32 32 32 32 | 48 48 48 48 | 64 64 64 64 | 80 80 80 80 | 96 96 96 96 |
| 16 16 16 16 | 32 32 32 32 | 48 48 48 48 | 64 64 64 64 | 80 80 80 80 | 96 96 96 96 |

| LEVEL 7 | LEVEL 8 | LEVEL 9 | LEVEL 10 | LEVEL 11 | LEVEL 12 |
|---|---|---|---|---|---|
| 112 112 112 112 | 128 128 128 128 | 144 144 144 144 | 160 160 160 160 | 176 176 176 176 | 192 192 192 192 |
| 112 112 112 112 | 128 128 128 128 | 144 144 144 144 | 160 160 160 160 | 176 176 176 176 | 192 192 192 192 |
| 112 112 112 112 | 128 128 128 128 | 144 144 144 144 | 160 160 160 160 | 176 176 176 176 | 192 192 192 192 |
| 112 112 112 112 | 128 128 128 128 | 144 144 144 144 | 160 160 160 160 | 176 176 176 176 | 192 192 192 192 |

| LEVEL 13 | LEVEL 14 | LEVEL 15 |
|---|---|---|
| 208 208 208 208 | 224 224 224 224 | 240 240 240 240 |
| 208 208 208 208 | 224 224 224 224 | 240 240 240 240 |
| 208 208 208 208 | 224 224 224 224 | 240 240 240 240 |
| 208 208 208 208 | 224 224 224 224 | 240 240 240 240 |

| | | | | | | | | | |
|---|---|---|---|---|---|---|---|---|---|
| LEVEL 1 STRUCTURE | 1 33 | 4 36 | 2 34 | 3 35 | LEVEL 2 STRUCTURE | 5 41 | 8 44 | 6 42 | 7 43 |
| LEVEL 3 STRUCTURE | 9 49 | 12 52 | 10 50 | 11 51 | LEVEL 4 STRUCTURE | 13 57 | 16 60 | 14 58 | 15 59 |
| LEVEL 5 STRUCTURE | 17 61 | 20 64 | 18 62 | 19 63 | LEVEL 6 STRUCTURE | 21 69 | 24 72 | 22 70 | 23 71 |
| LEVEL 7 STRUCTURE | 25 73 | 28 76 | 26 74 | 27 75 | LEVEL 8 STRUCTURE | 29 81 | 32 84 | 30 82 | 31 83 |
| LEVEL 9 STRUCTURE | 37 85 | 40 88 | 38 86 | 39 87 | LEVEL 10 STRUCTURE | 45 93 | 48 96 | 46 94 | 47 95 |
| LEVEL 11 STRUCTURE | 53 97 | 56 100 | 54 98 | 55 99 | LEVEL 12 STRUCTURE | 65 101 | 68 104 | 66 102 | 67 103 |
| LEVEL 13 STRUCTURE | 77 109 | 80 112 | 78 110 | 79 111 | LEVEL 14 STRUCTURE | 89 113 | 92 116 | 90 114 | 91 115 |
| LEVEL 15 STRUCTURE | 105 117 | 108 120 | 106 118 | 107 119 | | | | | |

FIG. 21B

| | | | | | | | | | |
|---|---|---|---|---|---|---|---|---|---|
| LEVEL 1 | 2 | 8 | 4 | 6 | LEVEL 2 | 11 | 17 | 13 | 15 |
| | 70 | 77 | 72 | 74 | | 87 | 94 | 89 | 91 |
| LEVEL 3 | 19 | 26 | 21 | 23 | LEVEL 4 | 28 | 34 | 30 | 32 |
| | 104 | 111 | 106 | 108 | | 121 | 128 | 123 | 125 |
| LEVEL 5 | 36 | 43 | 38 | 40 | LEVEL 6 | 45 | 51 | 47 | 49 |
| | 130 | 136 | 132 | 134 | | 147 | 153 | 149 | 151 |
| LEVEL 7 | 53 | 60 | 55 | 57 | LEVEL 8 | 62 | 68 | 64 | 66 |
| | 155 | 162 | 157 | 159 | | 172 | 179 | 174 | 176 |
| LEVEL 9 | 79 | 85 | 81 | 83 | LEVEL 10 | 96 | 102 | 98 | 100 |
| | 181 | 187 | 183 | 185 | | 198 | 204 | 200 | 202 |
| LEVEL 11 | 113 | 119 | 115 | 117 | LEVEL 12 | 138 | 145 | 140 | 142 |
| | 206 | 213 | 208 | 210 | | 215 | 221 | 217 | 219 |
| LEVEL 13 | 164 | 170 | 166 | 168 | LEVEL 14 | 189 | 196 | 191 | 193 |
| | 232 | 238 | 234 | 244 | | 240 | 247 | 242 | 244 |
| LEVEL 15 | 223 | 230 | 225 | 227 | | | | | |
| | 249 | 255 | 251 | 253 | | | | | |

FIG. 21C

METHOD AND APPARATUS FOR LOCALLY BLENDING GRAY DOT TYPES OF THE SAME OR DIFFERENT TYPES TO REPRODUCE AN IMAGE WITH GRAY LEVEL PRINTING

CROSS REFERENCE TO RELATED APPLICATIONS

This application is related to U.S. application Ser. No. 08/353,643 (I) and No. 08/353,649 (II), both filed on even date herewith in the name of H. T. Tai and entitled, respectively, 'Method and Apparatus for Tone Adjustment Correction on Rendering Gray Level Image Data.' and 'Reproduction Apparatus and Method For Adjusting Rendering with Toners of Different Particle Sizes'.

FIELD OF THE INVENTION

The present invention relates to the field of encoding pictorial imagery for reproduction on display or printing systems, and more particularly, to rendering a dot in a display or printing apparatus that uses gray level display/printing.

BACKGROUND OF THE INVENTION

As noted in my U.S. Pat. No. 5,200,831, digital printing (the term "printing" is used to encompass both printing and displaying throughout) of gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes(or alternatively dot densities for dots of the same size), for example, from three dot-sizes or densities of 2 bits/pixel to 15 different dot-sizes or densities of 4 bits/pixel. An image could then be rendered with 133 line screens per inch (5.24 lines per mm) and 128 gray scales of higher quality image. Although providing higher image quality with respect to line resolution and tonal scales, gray level halftoning presents its own dot rendering issues.

My U.S. Pat. No. 5,200,831 addresses the problem that exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

When scanning a document, image processing techniques have been applied to convert a gray scale image into an image representation which a printer can accept (either binary format or gray level format). In this scanning process, text areas, line drawing and halftone pictures are indistinguishable from each other, and all appear to be a gray scale image. An improper conversion process creates artifacts in the hardcopy such as a jagged boundary in the text area, or a Moire pattern in the halftone region. To overcome this, intelligent processes have been developed to segment the image into different regions of text, line drawing, and picture. Different conversion processes for the individual segments were then applied to these segments to restore the original document. However, these segmentation and conversion processes unduly complicate the digital copying process.

The unified rendering method and apparatus disclosed in my patent provides gray level printing that satisfactorily reproduces images that contain text, line drawing, halftone and/or continuous tone regions, with different gray dot representations selected for the specific regions.

FIG. 1 illustrates an arrangement which reproduces a document as described in my U.S. Pat. No. 5,200,831. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the framestore 17, the printer 18 and the display 20 are of conventional hardware design.

In providing a gray level signal for a specific pixel to be printed, the controller 16 selects between a "mixed dot" type rendering technique and a "fixed threshold" type rendering technique. These two rendering techniques will now be discussed.

In gray level printing, each pixel has the capability to render several different dot sizes, and thus different gray levels. However, instead of simply providing each pixel with an independent gray level, several pixels may be organized together to form a super pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels (including zero) can be provided with gray level printing for each pixel in a cell (3 bits/pixel). When the cell is made up of 4×4 pixels, for example, the gray level printing allows 113 different gray shades to be rendered for that cell.

The formation of the dots in the pixels of a cell can be performed in a number of different manners to achieve different desired results. The dots can be formed as "full" dot, "partial" dot, "mixed" dot or fixed dot type to provide gray level halftoning.

FIG. 2 illustrates an example of a 3-bit gray halftone dot layout for a full dot type formation. Also illustrated (greatly magnified) are seven different pixel-dot sizes, corresponding to the relative sizes that each individual pixel-dot can obtain. Note, however, in an electrophotographic system using LEDs as the exposure source primarily dot density rather than dot size may be changed with exposure. For convenience of illustration, the dot densities of the pixels are shown to increase in size. However, such is also intended to illustrate pixels of the same size but having different densities. There are 57 possible gray levels for the exemplary eight element cell 30 shown here. An example of the formation of a cell that is at gray level 12 will now be given.

The pixel circled in level 1, reference numeral 1, is formed to gray level 1 in level 1. (Only one cell will be described, although the pixels of other cells will be changed according to the same layout, as shown in FIG. 2). The dot at this circled pixel grows to higher gray levels as the gray levels for the cell increase from level 1 to level 2 all the way to level 7. One can see that this pixel increases in value from 1 to 7 as the levels increase. If the desired gray level for the cell 30 was 7, then the formation of dots would be completed once the circled pixel has reached the gray level of 7 in level 7. In this example, however, the gray level for the cell 30 is desired to be 12. At gray level 7, the circled pixel has reached its maximum gray level, so that a dot at another pixel must now start forming. This dot starts forming at the pixel indicated with a square around it in level 1, with the numeral 8.

The dot formation process continues, with the dot at this second pixel growing to higher gray levels as the levels again increase from level 1 to level 5. The formation process stops at level 5, since the cell has now reached the gray level value of 12. The halftone cell 30 now contains, as seen in FIG. 3, a dot of gray level 7, and a dot of gray level 5. The extension of this formation process to 57 cell gray levels, including zero, is easy to see from this example.

The full dot type process thus involves forming dots at the highest priority pixels to their maximum allowable gray level before beginning the formation of the dots at the next highest priority pixels.

In the electrophotographic process, the full dot type formation process is favored because it forms stable dots and exhibits less granularity (halftone printing noise). Formation of stable dots implies providing certain minimum exposure at a pixel location to ensure development, particularly in an electrophotographic system. Another method which carries more information detail than full dot, but at the cost of less stable dots, is the partial dot type, described below.

A 3-bit gray halftone dot layout for the partial dot type formation process is shown in FIG. 4. In this process, the cell 34 is built by providing a dot of the same gray level to each pixel in the cell to the extent possible, before building up the dot at any particular pixel to the next larger size. Thus, for a gray level of 6 for the cell 34, the circled pixel in level 1 would have a dot formed at that pixel with a dot gray level of 1 as would also the pixels numbered 2, 3, 4, 5 and 6. For larger gray levels, for example gray level 13, each of the pixels in the cell 34 would be built up to at least dot gray level of 1. The pixels indicated with a square around them in level 2 would be built up to have a dot gray level of 2.

The partial dot formation process can thus be seen to spread out the information over the cell, and therefore carries more information detail than the full dot. It does suffer from less stable dots (particularly in the electrophotographic process) and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 5. As can be seen for cell 36, until cell gray level 41 is reached, the pixels are constrained from growing beyond dot gray level of 5. The pixels grow in a full dot type process, with the pixel circled growing to a dot gray level of 5, with the pixel that is squared then starting to grow in gray level. The assumption underlying the mixed dot structure is that increasing cell gray levels are achieved by having pixels grow to a gray level wherein a stable dot can be formed, using say the electrophotographic process, before moving to another location to grow the next dot in the cell. Once all of the pixels in the cell have attained a gray level size of 5, corresponding to gray level 40, the cell then increases in gray level by using a partial dot type growth process. In other words, each of the pixels in the cell must grow to a dot gray level of 6 before any of the pixels begins growing to a dot gray level of 7.

Another type of rendering technique is a fixed threshold method. In this method each individual pixel is rendered with only limited tone scales. For example, 4 bits/pixel renders 16 different tone shades (including zero). The fixed threshold type renders the highest resolution among the various types, and an edge can be rendered more accurately down to each pixel. The fixed threshold type renders an image with even higher sharpness than the partial dot type since it is not limited by the cell size as is the partial dot type. The problem with the fixed threshold type is that it has less tone scales, so that a false contour could easily be seen in the rendered image. However, the fixed threshold type will provide excellent rendering results on text and halftone originals.

Although any one of the three dot types (full, partial or mixed) could be used to produce a satisfactory continuous tone image, the mixed dot type is the best choice for continuous tone rendering. For scanned text and halftone, the full dot type creates a screen structure in the background of text and a Moire pattern in the halftone. The mixed dot type also creates a screen structure in the background of text and creates a Moire pattern in the halftone, though weaker than that created by the full dot type. As stated above, the fixed threshold type renders well on both text and halftone. The unified rendering technique of the invention described in my aforementioned patent uses both fixed threshold type and mixed dot types according to local image content so that text, halftone and continuous tone images are all reproduced well.

In another embodiment of the invention described in my aforementioned patent, a partial dot is rendered for text and halftone, since text and halftone are usually higher contrast in nature. As with the fixed threshold type, the partial dot type will not cause the Moire pattern in the halftone and will produce a smooth text boundary. The mixed dot, the best of the different dot types for continuous tone images, is still rendered for continuous tone regions.

While the above prior art printing method and apparatus works well, the inventor has noted that further improvements to image quality can be made.

Thus, in the rendering apparatus and method described in U.S. Pat. No. 5,200,831, two distinct dot types are utilized in rendering. They are: partial dot vs. mixed dot or fixed threshold dot vs. mixed dot. The patent discloses that proper switching of a dot size in the rendering will produce a satisfied result on composite documents. However, the partial dot, mixed dot and fixed threshold dot have their distinct dot structures. Abrupt changes during dot switching can cause certain unnatural appearance in the image. It is, thus, an object of the invention to provide an improved rendering apparatus and method which minimizes this dot switching effect.

SUMMARY OF THE INVENTION

This and other objects of the invention are realized by an apparatus for producing an image, comprising means for providing first signals representing gray level unrendered pixel values of an image to be rendered; rendering means for rendering the image by comparing the unrendered pixel values with corresponding threshold values associated with one of plural different respective halftone threshold mask sets suitable for rendering different respective image types and generating second signals representing gray level rendering pixel values for the image; means responsive to said second signals for producing a gray level reproduction of the image; and wherein said rendering means includes blending means for generating, for certain pixels of said image, rendering pixel values that are each in response to operating with threshold values of different respective mask sets.

In accordance with another aspect of the invention there is provided for use with a printer apparatus, a controller for receiving signals representing a digitized image and for outputting digital signals representing gray values for rendering pixels in the original image in accordance with the requirements of a printer, the controller comprising means for calculating a local contrast index of a pixel of interest; means including a mask generating means for generating a rendering gray value for the pixel of interest from each of two different halftone screen masks; means for blending the rendering gray values for the two different halftone screen masks to generate a blended gray level pixel value for rendering the pixel of interest; and means for outputting said blended gray level pixel value for rendering by a printer apparatus.

In accordance with yet another aspect of the invention, there is provided a method for producing an image, comprising comparing gray level unrendered pixel values of the image with corresponding threshold values associated with one of plural different respective halftone threshold mask sets, the mask sets being suitable for rendering different respective image types, and generating first signals representing gray level rendered pixel values for the image; generating, for certain pixels of said image, second signals representing rendering pixel values that are generated in response to a blending operation involving characteristics of different respective mask sets; and in response to said first and second signals producing a gray level reproduction of the image.

BRIEF DESCRIPTION OF THE DRAWINGS

FIG. 2 illustrates an exemplary 3-bit gray halftone dot layout according to a full dot type of halftone cell growth pattern of the prior art;

FIG. 4 illustrates a 3-bit gray halftone dot layout according to a partial dot type of halftone cell growth pattern of the prior art;

FIG. 5 illustrates a 3-bit gray halftone dot layout according to a mixed dot type of halftone cell growth pattern of the prior art;

FIG. 7 illustrates a 5×5 moving window of pixel locations and identifies with numbers 1–16 pixel locations relative to a central pixel "x" that are used in calculating a local contrast index;

FIG. 8 is a chart illustrating the relationship of "membership" value of a halftone screen dot type to calculated contrast index;

FIG. 10A is a threshold mask set for grayscale screen #1; which is one exemplary screen for use in the unified rendering apparatus and method of my invention;

FIG. 10B illustrates two levels of a 4-bit gray halftone dot layout according to a mixed dot type of halftone cell growth pattern whose threshold mask set is shown in FIG. 10A;

FIG. 11 is a threshold mask set for grayscale screen #2; which is a second exemplary screen for use in the unified rendering apparatus and method of my invention;

FIG. 12 is a threshold mask set for grayscale screen #3; which is a third exemplary screen for use in the unified rendering apparatus and method of my invention;

FIG. 13 is a threshold mask set for grayscale screen #4; which is a fourth exemplary screen for use in the unified rendering apparatus and method of my invention;

FIGS. 21A, B and C illustrate respectively a gray level template, gray halftone dot layout and threshold mask set for use in the rendering apparatus and method of the invention.

DETAILED DESCRIPTION OF THE PREFERRED EMBODIMENTS

Figure 1:
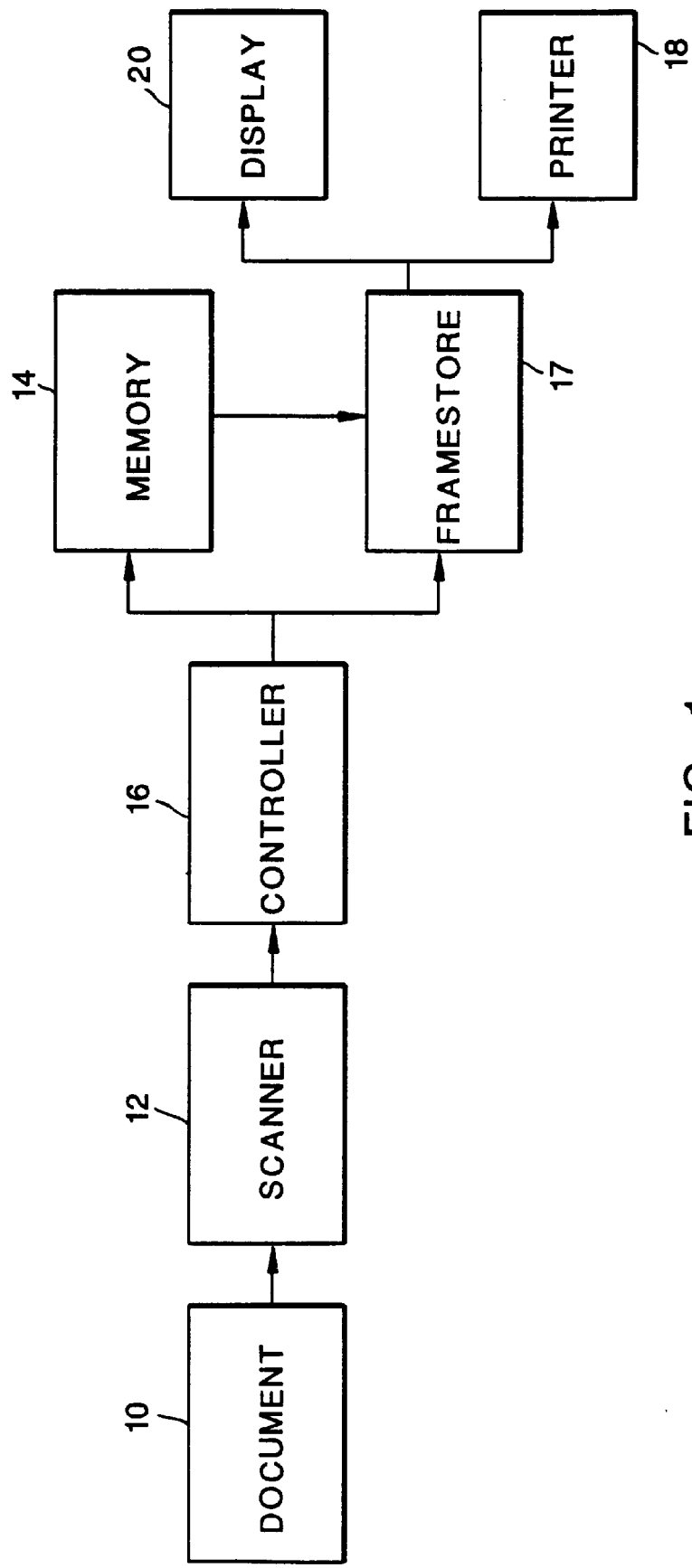
FIG. 1 illustrates a block diagram of an apparatus for reproducing an image as known in the prior art.
Figure 3:
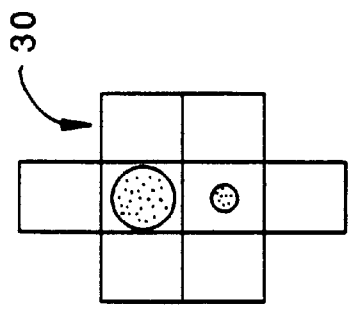
FIG. 3 illustrates a cell with dots that have been formed.
Figure 6:
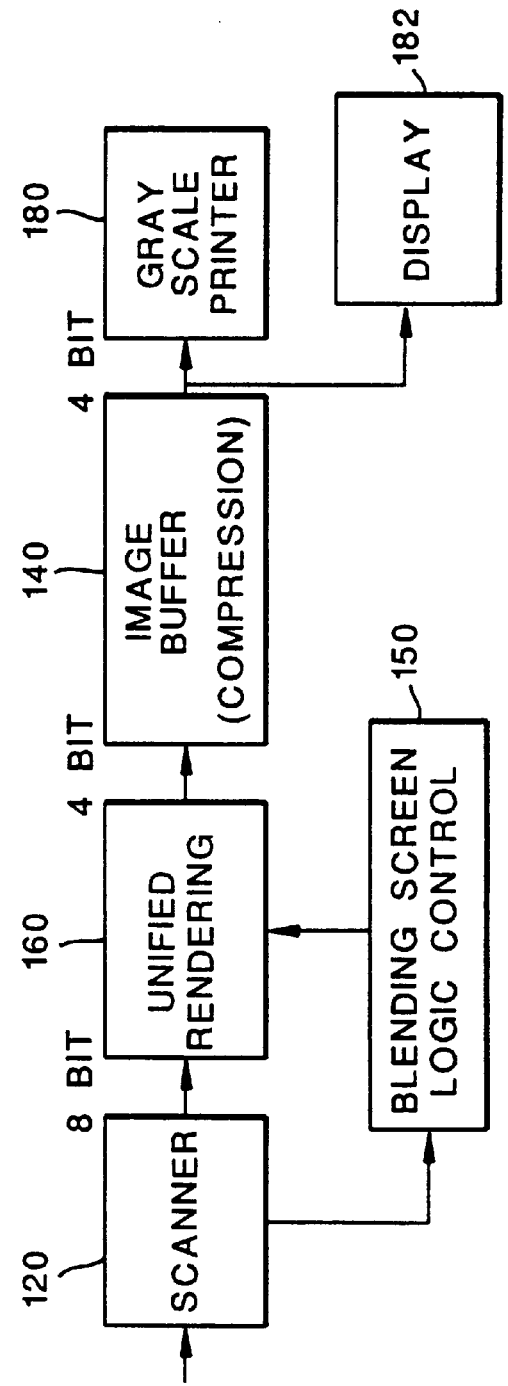
FIG. 6 illustrates a block diagram of an apparatus for reproducing an image in accordance with the unified rendering method of the invention.

With reference now to FIG. 6, there is shown a block diagram of a rendering apparatus that includes circuitry for processing image data in accordance with the algorithms to be described herein. In this apparatus which takes the form of a printer there is provided a scanner 120, a unified rendering controller 160 that renders raw or unrendered data from the scanner into enhanced printable form for printing by say an electrophotographic printer, an image buffer 140 that stores data for one or more pages of rendered data and a grayscale printer 180. Also illustrated in FIG. 1, is a blending screen logic control 150 whose function will be described below in more detail.

Typically the scanner 120 may be a linear array of CCDs or other photosensitive devices that generate a signal for each pixel area scanned over a document. Assume for example that the scanner scans a document sheet at a resolution of 400 dots per inch (dpi) (15.75 dots per mm) resolution in both directions. An analog signal representing density may be converted to say an 8-bit digital signal per pixel providing information relative to density of a corresponding pixel as following between 0, i.e. white background of document sheet in this case, and 255 full black. This 8 bit value may be adjusted for gamma correction as is known but even this gamma corrected value prior to rendering will be considered a raw scanned in image value in accordance with the disclosure herein. The examples herein will be described with regard to reproduction of black and white images but the invention herein is also applicable to color.

The unified rendering controller 160 is provided to generate threshold values to which the instant pixel under consideration is to be compared to determine what gray level that pixel is to be printed to best render same in accordance with the limitations of the electrophotographic process including the printer which in this example is only rendering pixels at a bit depth of 4-bits per pixel.

After a decision is made as to what gray level the pixel is to be rendered, the digital signal representing such decision is stored in image buffer 140. The corresponding rendered pixel data for all the pixels on a page and even those on many pages may be stored in this buffer as is well known. In order to reduce the memory requirements for such storage the rendering data may be compressed and stored in compressed form in accordance with well known compression algorithms. The compressed rendering pixel data is then output to the printer 180 by first expanding the data out of compressed form. The expanded data, now back substantially in rendering pixel data form, may be stored in a frame and/or line buffers for printing by the printer 180.

The printer 180 is preferably one that forms a latent electrostatic image on an electrophotoconductive recording medium as is also well known. In such printers, an electro-optical recording source such as a laser or LED print source is used to modulate light in accordance with the rendering image data. The modulated light forms, through selective discharging of a uniformly electrostatically charged image frame on the medium, a latent electrostatic image on the recording medium. This latent image can be developed by electroscopic toner particles of the desired color and transferred either directly or indirectly to a record member say a sheet of plain paper. As noted above, the rendering apparatus of the invention may also be used with a gray level dot matrix display 182.

With reference now to FIGS. 7–9 and 10–13, description will now be provided of the apparatus and method of the invention that incorporates a blending operation. The apparatus and method of the invention will now be described in conjunction with a specific example although those skilled in the art will appreciate that other resolutions, bit depths, screens, etc. may be similarly used in accordance with the teachings provided herein.

In this example, it is assumed that the rendering will be a 400 dpi (15.75 dpmm), 4-bit grayscale rendering. Four grayscale screens with different dot characteristics are pre-designed. Their cell template sizes are all 4×4 pixels; however, a halftone cell in each template includes only 8 pixels as in the example provided previously.

In this example, assume further that grayscale screen "1" is designed with a 4-bit, 141 lines per inch (LPI) (5.55 LPmm) mixed dot halftone screen structure that will be used for rendering images in a low contrast region. The grayscale screen "2" is another 4-bit, 141 LPI (5.55 LPmm) mixed dot halftone screen but with weaker screen structure than grayscale screen "1". It will be used for rendering images in a medium-to-low contrast region. The grayscale region "3" is designed with a 4-bit, 200 LPI (7.87 LPmm) partial dot non-screen structure that will be used for rendering images in the medium-to-high contrast region. This is identified as a non-screen structure because the plural dot type of dot structure tends to disperse dots and minimizes screen appearance and when combined with 200 LPI (7.87 LPmm) structure in an electrophotographic process produces little visual appearance of a screen structure. The grayscale screen "4" is designed with a 4-bit, 400 LPI (15.75 LPmm) non-screen structure. It includes masks that have the same threshold value at each location but wherein the threshold value changes with gray level. This is known as the fixed threshold dot structure. It is used for rendering images in a high contrast region. Four respective different grayscale dot masks are illustrated in FIGS. 10–13.

In the rendering operation (see FIG. 7) a local contrast index is first calculated at a current processing pixel location. The contrast index is a contrast value in a local 5×5 pixel region. The local contrast index (CI) is calculated by detecting a difference between the maximum and minimum densities of neighboring pixels along each of two diagonals in the 5×5 pixel region about the pixel of interest (x) and selecting the maximum difference. More particularly, CI=Max (C1,C2) where C1=Max (1,2,3,4,13,14,15,16)-Min (1,2,3,4,13, 14,15,16) and C2=Max (5,6,7,8,9,10,11, 12)-Min (5,6,7,8,9,10,11,12). Thus, for each pixel in the image, a 5×5 window of neighboring pixels is formed and their raw densities considered for calculation of the local contrast index.

Figures 20A, 20B:
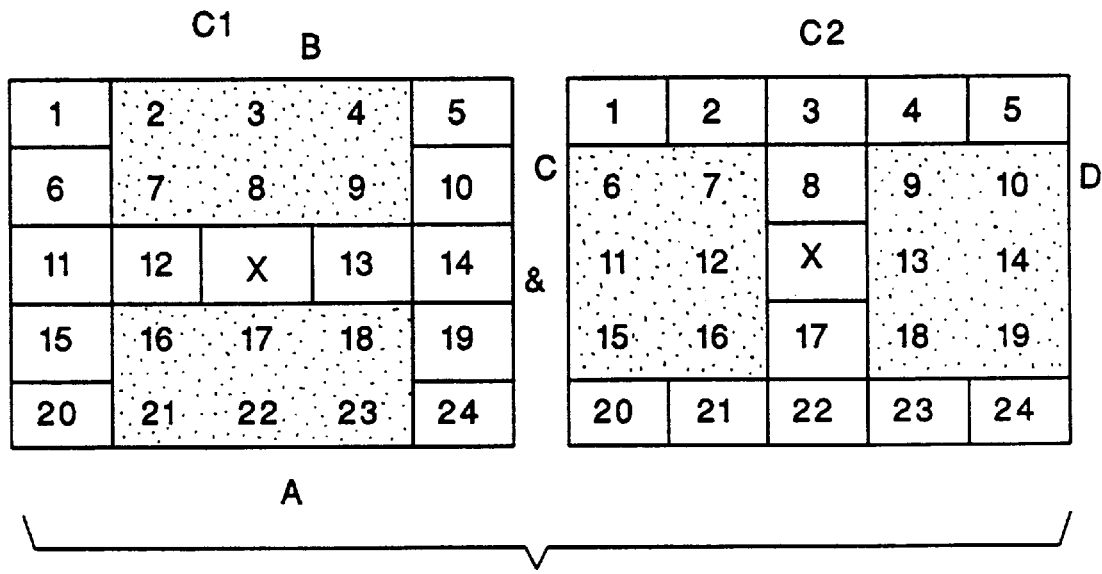
FIGS. 20A and 20B illustrate 5×5 moving windows of pixel locations and identify with numbers 1–24 pixel locations relative to a central pixel that are used in alternative methods of calculating a local contrast index.

With references to FIGS. 20A and 20B, there are illustrated alternative methods for calculating the local contrast index. In FIG. 20A, the contrast index (CI) is still calculated as CI=Max (C1, C2). However, C1=Max (A,B)-Min(A,B) or alternatively C1=Max (B)-Min(A) or C1=Max (A)-Min (B). A and B are the respective pixels in the shaded areas A and B. Similarly, C2=Max (C,D)-Min(C,D) or in conjunction with the respective stated alternative C2=Max(D)-Min (C) or C2=Max(C)-Min (D). In a still further alternative calculation mode and with reference to FIG. 20B, the contrast index is calculated using all the surrounding pixels of the center pixel of interest so that CI=C3 wherein C3=Max(E)-Min(E).

Figure 9A:
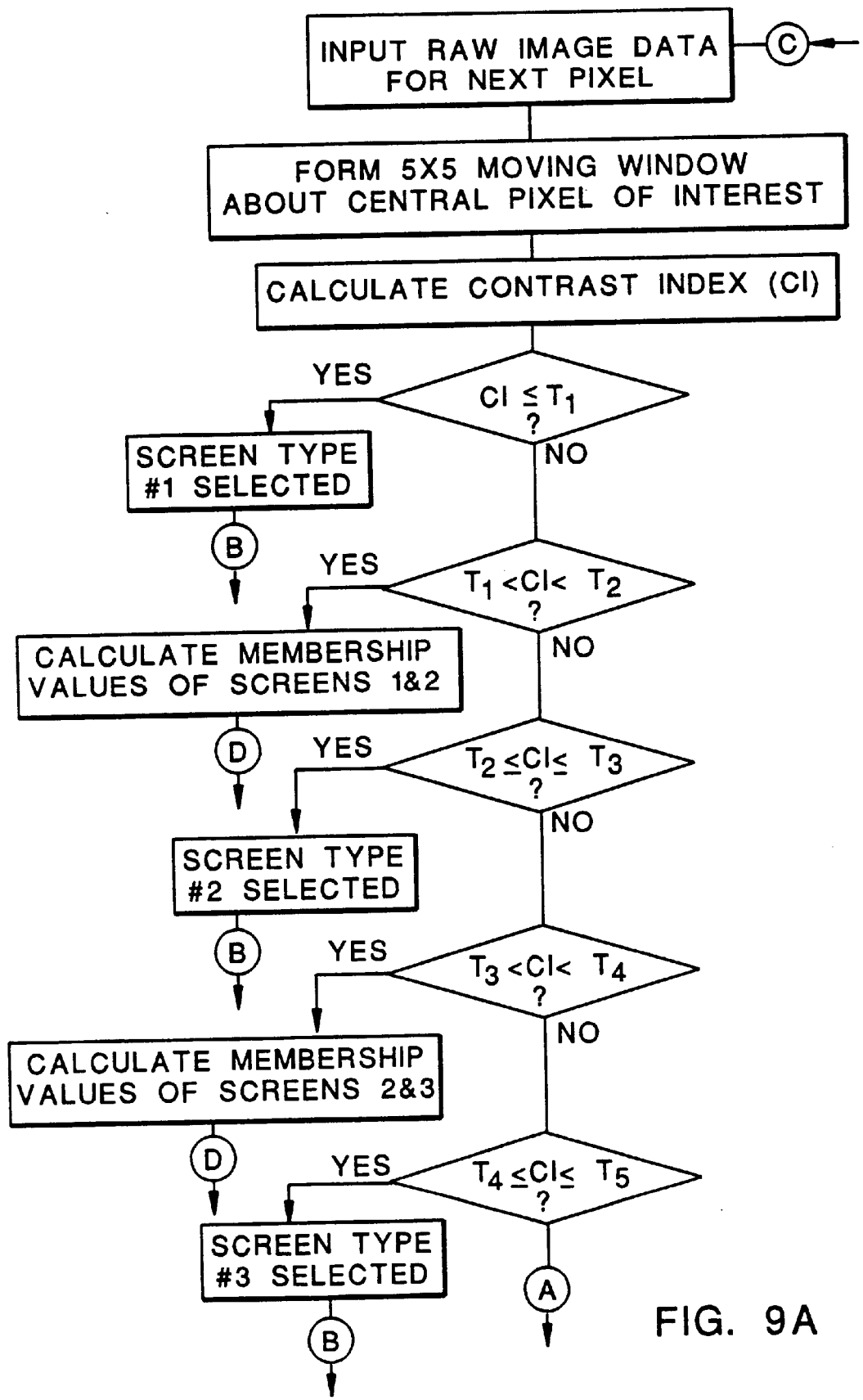
FIGS. 9A, B and C is a flow diagram of a computer program or programmed logic device for use with the unified rendering apparatus and method of the invention.
Figure 9B:
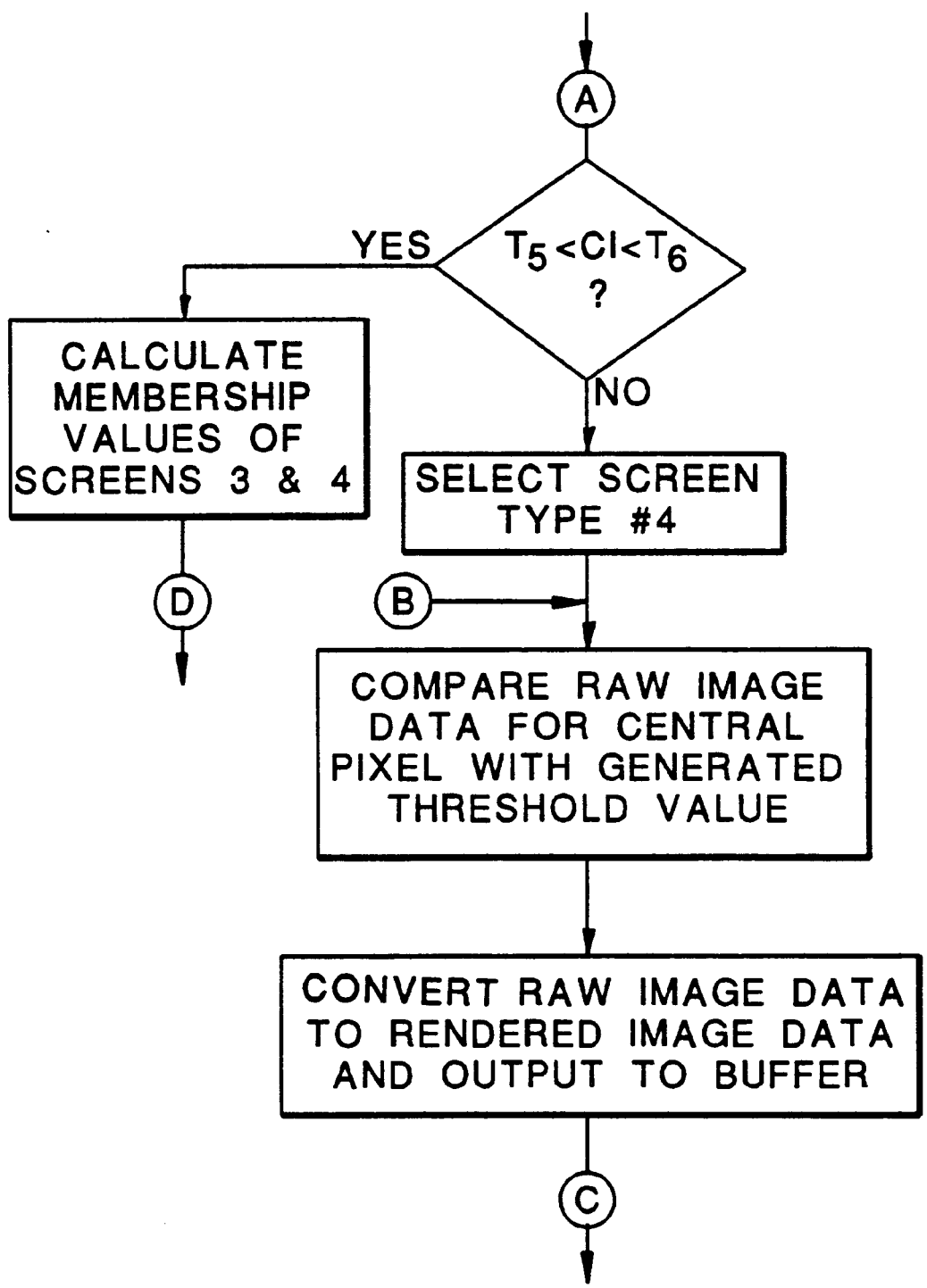
Figure 9C:
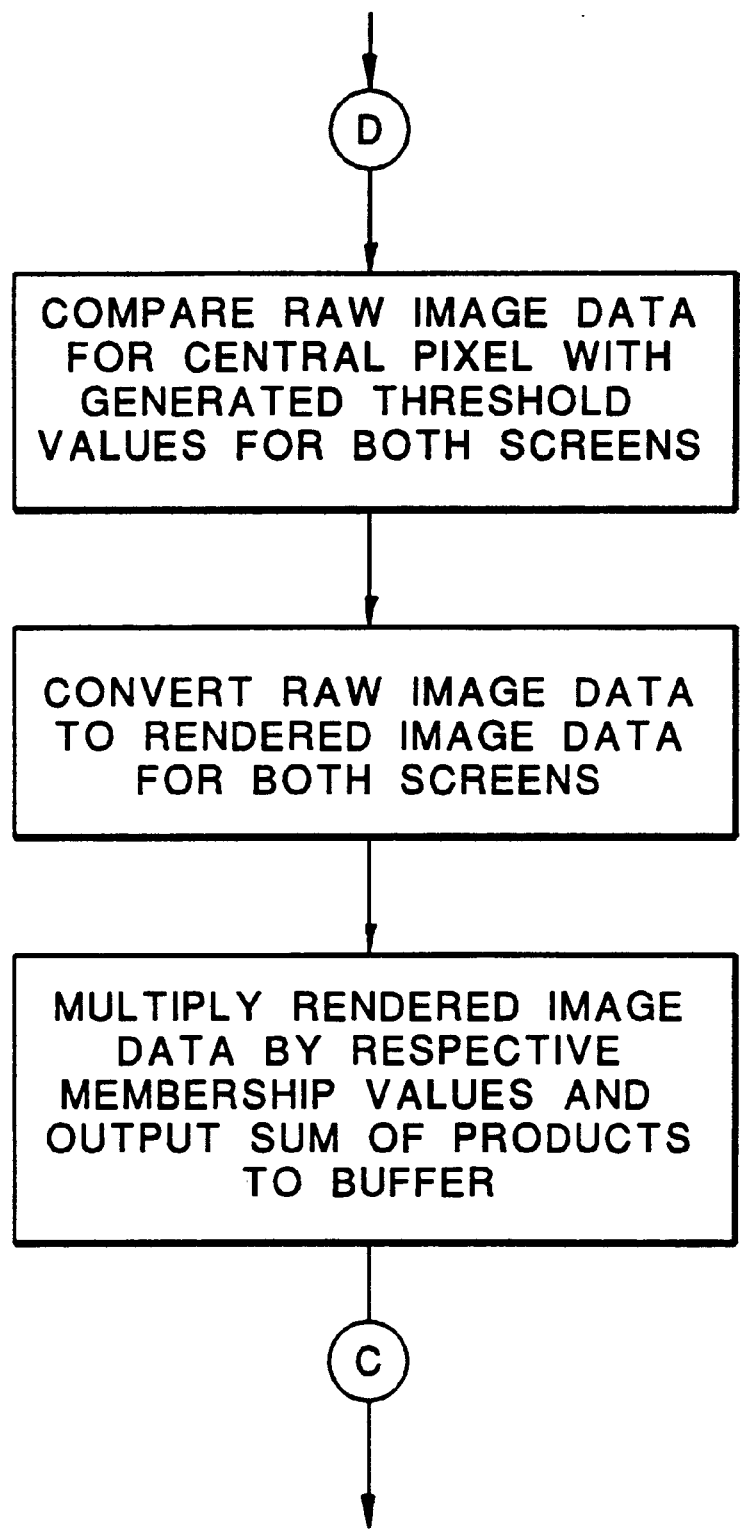

As may be seen in the flowchart of FIGS. 9A, B and C and the blending screen operating diagram of FIG. 8, where the local contrast index is between $T_1$ and $T_2$ or between $T_3$ and $T_4$ or between $T_5$ and $T_6$ blending of two different screen types will occur. Otherwise, screen 1 is used for $CI \leq T_1$, screen 2 is used for $T_2 \leq CI \leq T_3$, screen 3 is used for $T_4 \leq CI \leq T_5$, and screen 4 is used for $T_6 \leq CI$.

With reference now to FIGS. 10–13, the threshold mask values for each of the four screens of this example are shown. The threshold mask values of FIG. 10A are determined by first devising a growth strategy for this mixed dot. As shown in FIG. 10B, the level 1 and level 2 growth strategy of this 4-bits per pixel gray halftone dot layout is shown and indicates that the growth strategy for this cell is for one pixel (indicated at 1) in the cell (FIG. 10B, level 1) to grow to gray level 12 before a next pixel at a location indicated at 13 commences to grow. Then, that next pixel grows to 12 before a third pixel commences to grow (indicated at 25) and so on. For the 4-bits per pixel case, 15 levels of these halftone dot layouts are created. The corresponding threshold mask values (FIG. 10A) are then determined by multiplying the corresponding dot layout value by a scaling factor. The scaling factor is obtained by dividing the maximum raw pixel value (255) by the maximum number of halftone dots. For the 4-bits per pixel case with the screen frequency chosen at 141 LPI (5.55 LPmm), there are a total of 120 different halftone dots since a halftone cell has 8 pixels and there are 15 levels to each pixel. Thus the scaling factor is 2.125.

Assuming the contrast index is such that screen 1 (FIG. 10) is selected, a first pixel has its raw gray level value, say 63, compared with the set of threshold values (53, 55, 57, 60, 62, 64, 66, 68, 70, 72, 74, 77, 210, 227 and 244). Note these are the respective values in the upper left corner of the 15 gray level threshold masks illustrated in FIG. 10. If the raw pixel gray value is 63, then the pixel is assigned a rendering gray level 5, since 63 is greater than 62 but less than 64. Assume now that the next pixel also has a raw pixel value or unrendered pixel value of 63 and a contrast index requiring selection of screen 1. This value is compared with the set of threshold values at the next location in the mask which are (130, 132, 134, 136, 138, 140, 142, 145, 147, 149, 151, 153, 217, 234, 251). The raw pixel value 63 is less than all these values and is assigned a rendering pixel level 0. The operation of assigning rendering gray level pixel values is similar for each of the screens of FIGS. 10–13. However, where blending is to occur in accordance with the invention the following is done. In this example, $T_1$=15, $T_2$=30, $T_3$=45, $T_4$=60, $T_5$=100 and $T_6$=120. These settings are based, as described more fully below, on the statistical distribution of contrast index of different image types at corresponding input scanning resolutions (i.e., 400 dpi (15.75) dpmm in this example). In this blending screen logic, it will be decided how each screen will be used to output the current pixel value. For example, if the contrast index is located 100% in screen "1", then only screen "1" output value will be used. Otherwise, if the contrast index is located at 70% of screen "1" and 30% of screen "2" the output value is calculated by blending. The 70% , 30% membership values are determined by considering $(T_i-T_1)/(T_2-T_1)$ where $T_i$ is the calculated local contrast index for the pixel of interest and it is determined to be between $T_1$ and $T_2$. For example, say the rendering gray level output pixel value for screen "1" is 12 in the 4-bit representation while the rendering gray level output pixel value for screen "2" is 8. Then 12×0.7+8×0.3=10.8. A round-off value 11 will be the rendering gray level output for the combination of two screens. Similarly, depending on the calculated contrast index, it may entail mixing of screen "2" and screen "3" or screen "3" and screen "4". For a more pleasing result, this operation is repeated pixel by pixel across the whole image field.

Figure 14:
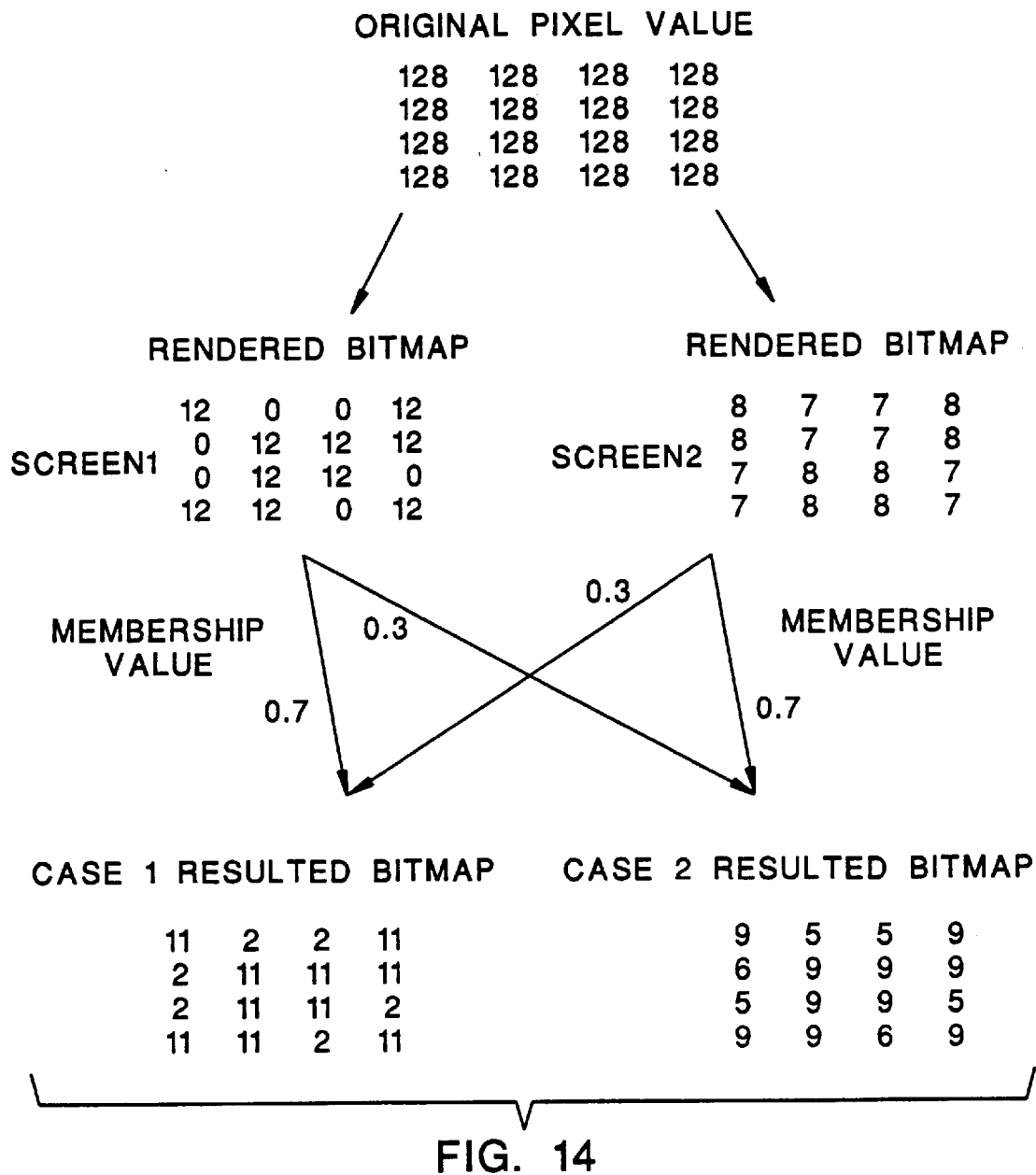
FIG. 14 is an illustrative example of blending of rendered gray level bits that have been determined from different gray scale screens in accordance with the invention.

With reference to FIG. 14, two examples are shown of blending of screens 1 and 2 for a group of pixels, all having original or raw pixel values 128 which is a middle gray level between 0 and 255. In cases 1 and 2, the contrast indices that are calculated have values between T1 and T2. In case 1 the calculated contrast index determines that screen 1 is to have a membership value of 70% and screen 2 is to have a membership value of 30%. In case 2, the calculated contrast index determines that screen 1 is to have a membership value of 30% and screen 2 is to have a membership value of 70%. The gray values for the rendering bit maps are first calculated as if there was no blending. After this the membership values are used to form the resulting blending gray level rendering bit map for each case. The design of multiple screens with blended effects in the image rendering operation can improve the rendered image quality of mixed type documents significantly. Since text image types usually have a medium-to-high contrast index, a higher resolution screen with less screen structure will be deployed there. This results in a sharp text without screen artifacts along its border. While the contone image types usually have a low-to-medium contrast index, a lower resolution screen with smooth gradations screen structure will be deployed there. This also results in a pleasant picture rendering. For the halftone originals, they are covered in the wider range of a medium contrast index, a partial dot with weak screen structure is preferably deployed for rendering such originals. This avoids the Moire pattern artifacts in the halftone region and maintain its original halftone structure.

Figure 19A:
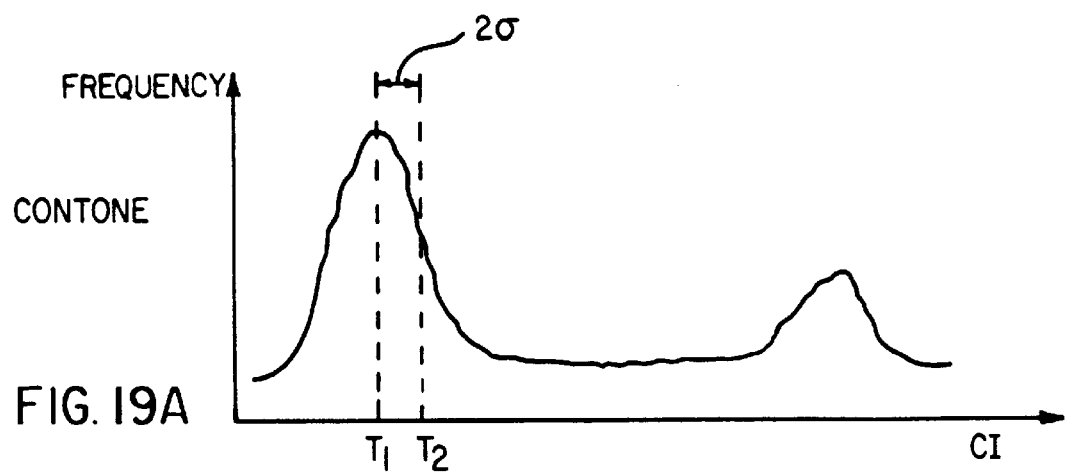
FIGS. 19A, B and C represent histograms used in calculating "T" values shown in FIG. 8.
Figure 19B:
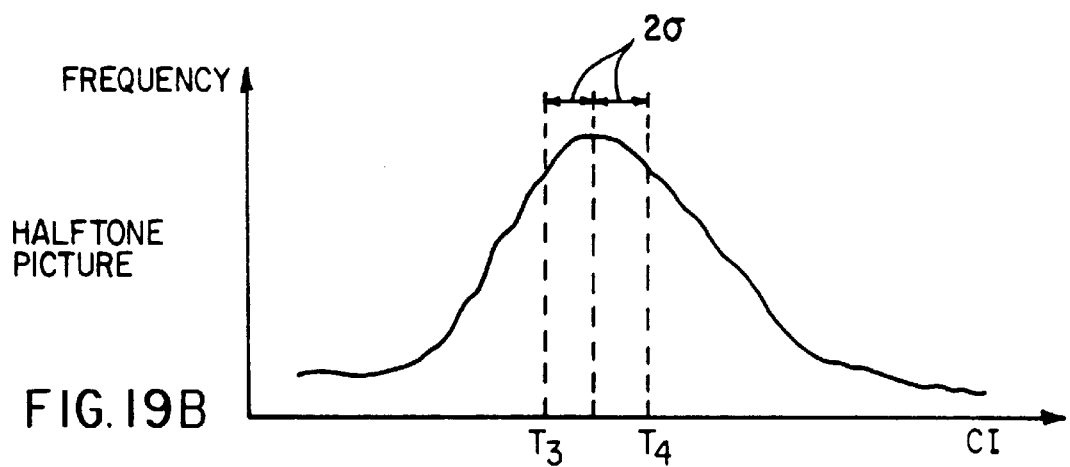
Figure 19C:
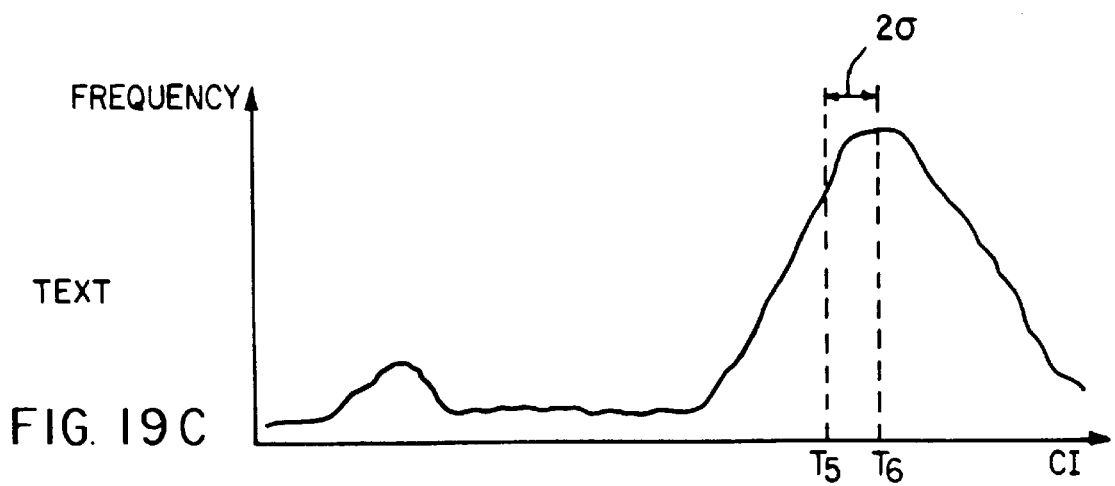

The "T" value setting of contrast index value are preferably determined by examining of different images. Firstly, one may collect a few images with identified image types, for example, those with a text image, those with a contone picture image and those with a halftone picture image (rendered at about 150 LPi or 5.9 LPmm ). These images are then scanned into digital form at a resolution similar to the output printing resolutions say 400 dpi (15.75 dpmm). Secondly, a 5×5 moving pixel window is run across raw scanned data of each image to collect local contrast index information. That is, a histogram is produced of local contrast index (see FIGS. 19A, B and C). The calculation of local contrast index is defined above. Lastly, each "T" value is determined from the analysis of the respective histogram of each image type. The values T5 and T6 can be determined from the histogram of the text image of FIG. 19C. The value T6 is set at the peak of the histogram and the value T5 is set at the two sigma point (lower CI) from the peak value. Similarly, the values T1 and T2 can be determined from the histogram of the contone picture. The value T1 is set at the peak of the histogram (see FIG. 19A) and the value T2 is set at the two sigma point (higher CI) from the peak value. The values T3 and T4, respectively, can be determined from the histogram of the halftone image at the two sigma (lower CI) from the peak and the two sigma point (higher CI) from the peak FIG. 19B.

Other techniques for blending screens may be used. In the above example of FIG. 14, blending was accomplished by blending of rendering gray values. In another approach the invention also contemplates blending of screen threshold matrix values to effectively create a new set of blended threshold matrix values from which rendering is accomplished by comparing the raw pixel value with the new set of threshold matrix values. For example, assume as in the example of FIG. 14 that the membership value for screen #1 is 0.7 and that for screen #2 it is 0.3. Assume further that the raw or original pixel value is 128 and that this pixel value is to be compared with the threshold matrix values in the upper left corner of a set of threshold matrix values. From FIG. 10A the set of threshold matrix values for this pixel location for screen #1 are $S_1$=(53, 55, 57, 60, 62, 64, 66, 68, 70, 72, 74, 77, 210, 227, 244). From FIG. 11, the set of threshold matrix values for this pixel location are for screen #2 are $S_2$=(15, 17, 19, 21, 23, 26, 106, 123, 140,157, 174, 191, 208, 225, 242). To form the new blended screen set ($S_N$) for this pixel location the corresponding threshold values of $S_1$ are multiplied by their membership value of 0.7. Then the respective products at each level are added together. Thus, level 1 of the new set $S_N$ is calculated as follows 53×0.7+ 15×0.3=42. Using this approach the blended set of threshold values for this pixel location is $S_N$=(42, 44, 46, 48, 50, 53, 78, 85, 91, 98, 104, 111, 209, 226, 243). In comparing the pixel raw value 128 with this blended set, it can be seen that this pixel would be assigned a rendering pixel value of at level 12 since 128 is larger than 111 but less than 209. For the next pixel location, it can be shown using the procedure shown above that a next pixel having a raw value of 128 and assuming the same membership values will be assigned a rendering gray level pixel value of 6.

This screen blending method can be generalized for grayscale image rendering. For example, with a proper selection of different angles of screens, it can be blended together without noticeable artifacts. Similarly, it can be applied to screens with different bit depths; i.e. number of bits per pixel. Thus, a screen with one-bit depth may be blended with screens of a different bit depth. The blending may be done either through a calculation process or through look-up tables or programmed logic arrays.

The description above describes generation of signals representing grayscale rendering image data from raw image data such as that coming from a scanner. However, there are times because of individual preference or requirements for certain special documents that adjustments be made for better image rendition. In the next embodiment to be described there is described an apparatus and method for modifying grayscale rendering image data to provide the ability to adjust tone with attendant advantages to be discussed.

Figure 15:
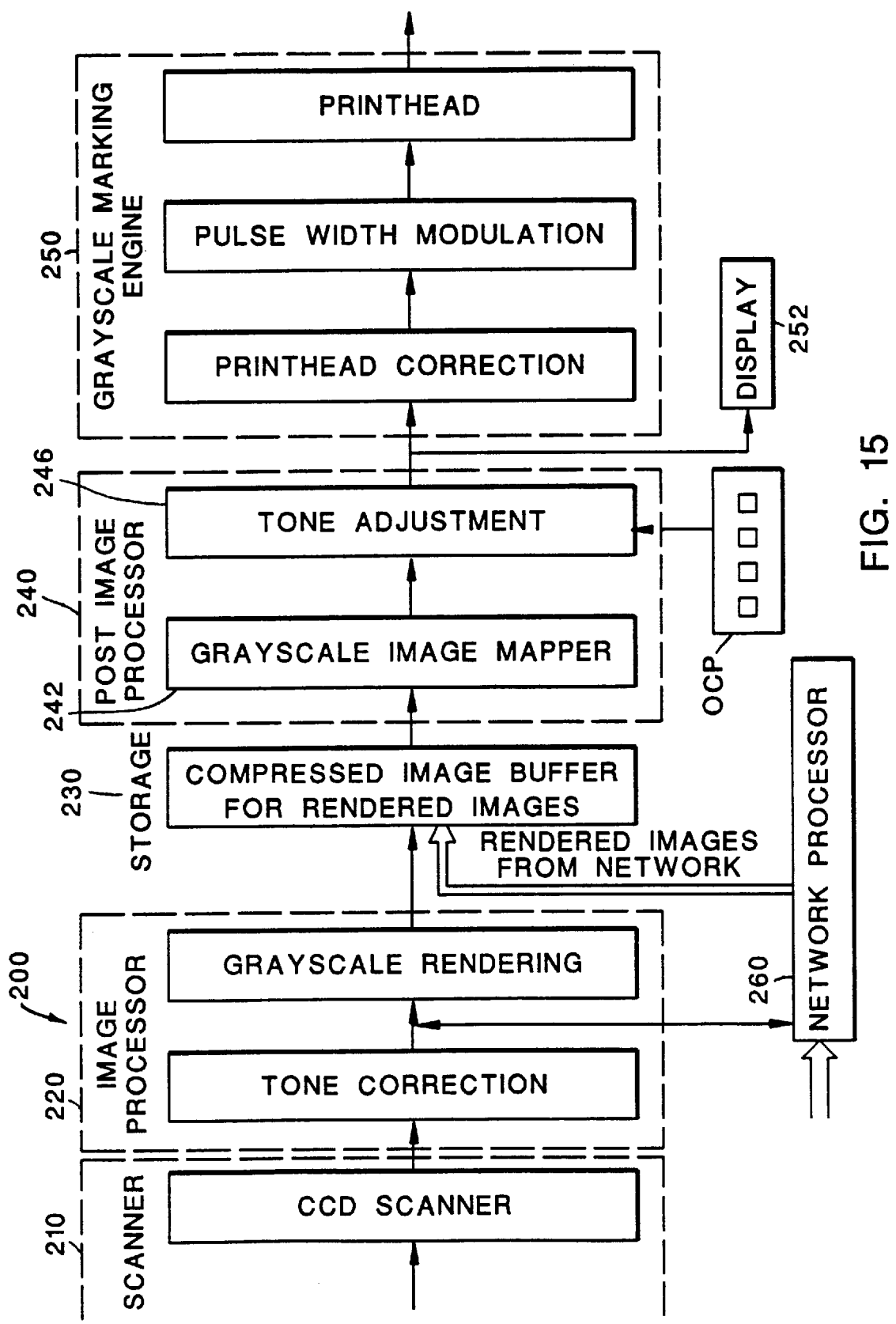
FIG. 15 illustrates a block diagram of an apparatus for reproducing an image in accordance with another embodiment of the invention.

With reference to FIG. 15, there is shown a block diagram of another embodiment of a reproduction apparatus 200 of my invention which includes a post image rendering processor 240 for modifying image signals to a grayscale marking engine or a display 252. The post image processor 240 comprises two block functional units, a grayscale image mapper 242 and post tone adjustment unit 246.

A grayscale marking engine 250 has the capability to print multiple image representations (different image bit-depths) say up to 8 bits per pixel bit depth gray level representation. Note this implies 255 gray levels. Of course, an 8 bit gray level image data signal may be modified to a higher number of bit levels to correct for nonuniformities in the recording elements, see U.S. Pat. No. 5,300,960.

The reproduction apparatus can receive inputs of any 1-bit, 2-bits, 3-bits, . . . , and 8-bit images for rendering by the 8-bits per pixel marking engine. However, for an incoming 1-bit per pixel image representation from the network processor 260, it is remapped from [0,1] to [0,255] before printing. For incoming 2-bits per pixel image representations from the network processor 260 or image processor 220, it is remapped from [0,1,2,3] to [0,85,170,255]. This remapping process is similar to other image representations. The function of the grayscale image mapper 242 is to convert rendering input image representations to a suitable output image representation appropriate for the 8-bits per pixel marking engine.

The mapper 242 further integrates or combines images to be recorded on one image frame into a gray level bit map. The input from the network may be raw pixel values that need to be converted to rendering pixel values through a thresholding operation. They can be subjected to tone correction before rendering as calibrated for the device from which the raw data was generated. Alternatively, the network data may be tone corrected and require rendering as described above. Assuming the new pixel data from the network is tone corrected and is to be assembled or combined with image data from the CCD scanner 210, the tone corrected data from the scanner is input to the network processor 260 and combined with tone corrected raw pixel data from the network and bit mapped in a grayscale image mapper forming part of the network processor 260. Before being combined in the bit mapper, the raw networked data is expanded to the gray level range of the scanner. For example, if the scanner 210 is 8-bits per pixel and the raw networked data is 2-bits per pixel, the raw networked data is as described above remapped from [0,1,2,3] to [0,85,170, 255] before being combined as a bit map with the data from the scanner. In bit-depth mapping each pixel is assigned a pixel value in accordance with a corresponding range of the printer or display for further processing. Then this combined bit mapped image is subject to unified grayscale rendering including blending as described above. The grayscale rendering values assigned by this process are compressed and stored in the image buffer 230. When output to the mapper 242, the combined image either is already expressed in 8-bits per pixel or may be remapped from say a lower bit depth, say 1, 2, 4 or 6-bits per pixel to the 8-bits per pixel.

The network processor 260 may also include a tone correction processor that corrects for the proper dot size to be printed with the corresponding input image density value to preserve image tone. Thus raw image data from the network processor may be tone adjusted before input to image processor 220 for gray scale rendering. The network processor 260 may also provide for a mapping of the image to the bit depth of the printer or display. The network processor may also provide for resolution conversion. Thus, if the data is 300 dpi data the processor may convert the data to the 400 dpi resolution of the printer, which is only used as an example since other printer resolutions are known and may be used. Thus, for example, 300 dpi raw or rendered image data could be interpolated by the network processor or other device using say bilinear interpolation and converted to a 400 dpi resolution suited for the printer. The network processor or circuitry in the image processor may further merge or combine the scanner data with data from the network to create a composite document using an image merge processor.

However, an output marking engine or a display typically has a nonlinear tonal response. Thus, fixed value mapping, as identified above, from lower bit depth image representations to 8-bit output are not adequate. Thus, post image processing tone adjustment is necessary on the data that has been converted to rendering image data. This post image processing tone adjustment will allow for an accurate image reproduction on a grayscale marking engine to avoid the need to again scan the original or again download the image from another source. Tone correction, as known in the prior art, is typically provided for by an image processor unit 220 during the process of generating grayscale rendering image data signal. Tone correction is usually set up for the proper "normal key" picture. For those "low key" or "high key" pictures, the picture will be either too dark or too light in those normal tone settings. Thus, tone adjustment is needed for reproducing certain kinds of pictures.

Figure 16:
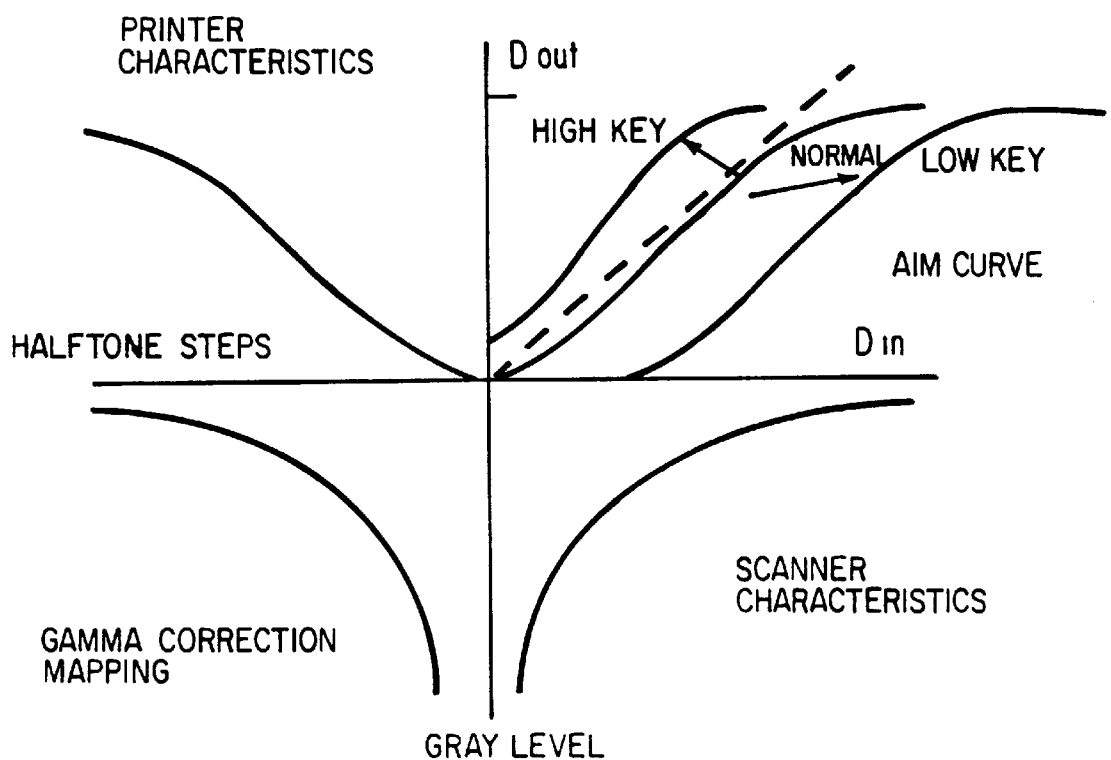
FIG. 16 illustrates a four quadrant tone reproduction diagram that illustrates relationships between various factors in reproducing an image.
Figure 17:
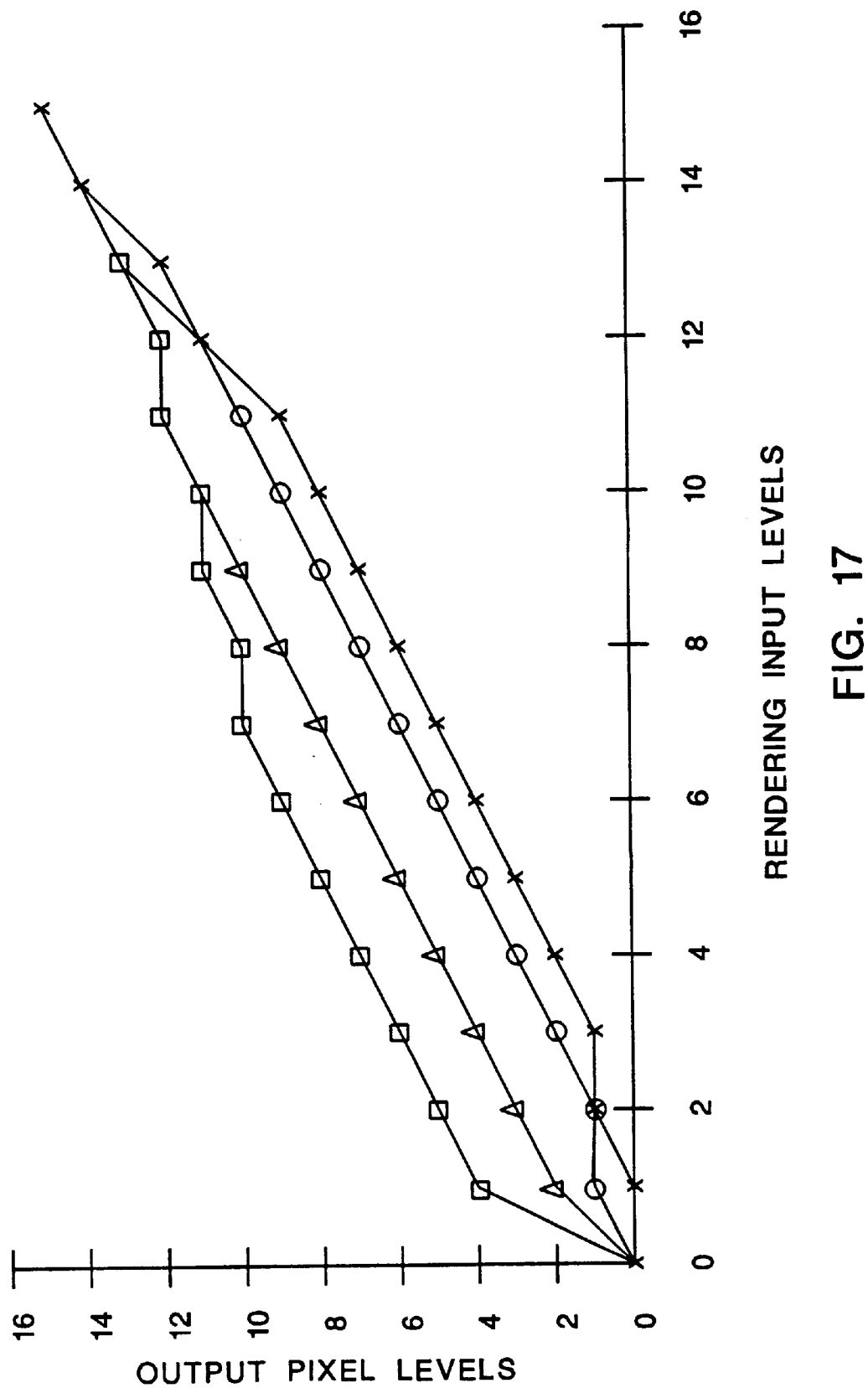
FIG. 17 illustrates an example of rendering data modification which may be used to modify rendering input pixel levels that are determined using the unified rendering algorithm of the invention but which are modified for post gray scale image tone adjustment.

The post image processing tone adjustment on rendering image data bears some similarity to gamma or tone correction that is known in the prior art but provided prior to rendering of the data. With reference to FIG. 16, a known tone reproduction control process diagram is illustrated. In this tone reproduction control process scanned data from CCD scanner 210 are corrected for in an image processor 220 by a gamma correction mapping which provides tone correction in accordance with a predetermined relationship between scanned-in density and the actual gray level present. FIG. 17 is one example of an image tone adjustment curve for the 4-bit marking engine of FIG. 15. The tone reproduction chart has four quadrants. The first quadrant (I) contains the input and output density of a specific tone reproduction curve, which specifies the gamma or the contrast of the image to be reproduced. The second quadrant (II) captures the characteristics of the gray level printing process. The fourth quadrant (IV) preserves the characteristics of the scanner, which converts the density to a gray value. The third quadrant (III) maps gray values into gray steps linking the quadrants IV, I and II together.

Figure 18:
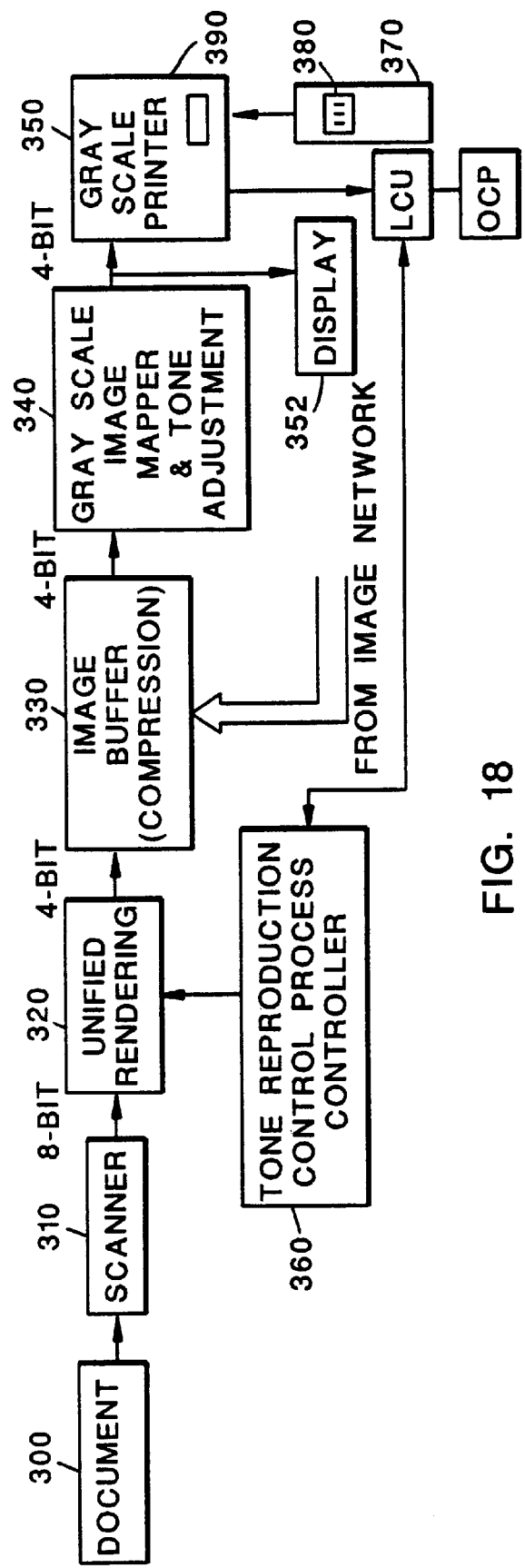
FIG. 18 illustrates a block diagram of an apparatus for reproducing an image in accordance with still another embodiment of the invention.

In FIG. 18, there is shown still another embodiment wherein a document 300 is scanned by a scanner 310 which generates an 8-bit signal representing density scanned. The raw scanned image data is subject to unified gray level rendering as described above including blending or other rendering technique. Note that the generation of a threshold mask is preferably made using processes such as the 4-quadrant tone reproduction control process disclosed herein. However, once the data for these masks are determined such masks may be stored or become calculated in a copier without going through the tone reproduction control process each time. The 4-bits per pixel gray level rendered data may now be stored in an image buffer 330 in say compressed form. When needed for printing (including displaying) the compressed data is expanded and output to a grayscale image mapper and tone adjustment post image processor 340. The grayscale mapper serves to take inputs from the image network which may be of image data having 1 bit per pixel or 2 or 3 bits per pixel and maps it to a 4-bits per pixel system having gray levels 0 through 15. As noted above, [0, 1] in a binary system may map to [0,15] in a 4-bit system but 2-bit or 3-bit systems may not map linearly to a 4-bit system. Tone adjustment as shown in FIG. 17, which illustrates various tone adjustment aim curves, may allow an operator to adjust tone by buttons or other controls on a copier's operator control panel OCP. In response to say pressing of a button or other control input, a rendering gray level pixel value may be adjusted to a selected aim curve and a tone adjusted rendering output gray level pixel value generated accordingly for sending to the printer or display 352 for printing a modified gray level image. The tone adjustment may be embodied in a look-up table or a programmed logic array. The gray level printer 350 as noted in FIG. 18 may be provided with printhead correction for correcting for nonuniformities of the recording elements or other known correction devices or schemes such as those which adjust through pulse-width modulation, pulse intensity modulation, etc.

Thus, there is disclosed improved means for compensating for non-linearity of tone response for the grayscale marking engine. Also, this post image processing tone adjustment has the advantage of providing for final tone adjustment on an image without the need to re-scan, re-render, or re-transmit the image again. This is because the rendering image data stored in memory is resent to the printer but first is subjected to post image processing tone adjustment in accordance with the new tone adjustment made.

In a grayscale rendering, there are some relationships between image bit-depth, rendered screen frequency, and image gradation levels. They are illustrated in the following. As the rendered image bit-depth increases; i.e. number of bits per pixel, the image gradation levels increase quadratically with the same cell template or mask size. Therefore, the rendered screen can be made finer (or higher screen frequency) by using a smaller cell template to achieve the same number of image gradation levels that are realizable. For example, a 2-bits per pixel image bit depth with an 8×10 halftone cell template of 40 pixels per halftone cell renders 121 (40×3+1) image gradations that results in a screen frequency of about 65 LPI (lines per inch) (2.56 LPmm) @400 dpi (15.75 dpmm) while a 4-bit image with 4×4 cell template of 8 pixels per cell provides 121 (8×15+1) image gradation levels that results in a screen frequency of 141 LPI (5.55 LPmm) @400 dpi (15.75 dpmm).

Furthermore, the toner particle size (from 6 um to 14 um range) has a major impact on image graininess and granularity as is generally known. The term graininess means the visual sensation of image fluctuations of the flat field. The granularity means the physical image noise measurements of the flat field. At the same screen frequency, for example 141 LPI (5.55 LPmm) halftone screen, images appear more grainy as toner particle sizes are increased from 6 um to 14 um. However, images formed using the same toner particle size appear more grainy as the screen frequency is increased. Furthermore, as screen frequency increases higher and higher and approaches continuous tone, the grainy appearance due to toner particle size increases and becomes more apparent Thus, image graininess is more sensitive to toner particle size at higher screen frequencies.

In grayscale printing a rendered screen can be made finer by using smaller cell templates. However, as noted above, this can cause a more grainy appearance in the rendered image. To maintain the same level of visual sensation of image graininess, a toner having small toner particle sizes can be used instead. Hence, a smaller cell template combined with small toner particles size can render a higher screen with a good image quality in grayscale rendering. For example, an image which is rendered with 141 LPI (5.55 LPmm) screen @400 dpi (15.75 dpmm) using 12 um toner particle size is visually equivalent from a granularity perspective to an image rendered at 200 LPI (7.87 LPmm) @400 dpi (15.75 dpmm) using 8 um toner particle size. However, the 200 LPI screened image carries more detail and visually is more like a continuous tone image.

An example of a high screen frequency (200 LPI, 7.87 LPmm) halftone dot structure for a 4-bit, 400 dpi printer is illustrated in FIGS. 21A, B and C. In this halftone dot structure, increasing cell gray levels are rendered by gradually building dots along a first line. When all locations along this first line are at gray level 8, dot growth gradually proceeds along an adjacent line. Thereafter there is dot growth gradually along the first line and back to the adjacent line. Printing halftone screens to provide stable line structures is described in my U.S. Pat. No. 5,258,850.

In accordance with a further aspect of my invention claimed in cross-reference application No. II both binary and grayscale rendering of an image to be printed may be adjusted in accordance with toner particle size. With reference to the embodiment shown in FIG. 18, the grayscale printer is an electrophotographic marking engine that includes a well or defined space (not shown) for receiving a toner container 370. The container may include a bar code or other indicia 380 indicating toner particle size. This new particle size may be input into the copier by the operator, or a sensor 390 inside the printer may sense the bar code which may be optical, magnetic electrically conductive or a mechanical code (depressions, elevations) that confers information relative to toner particle size in the container. Alternatively, toner particle size may be input by the operator via a keyboard or button on the copier's operator control panel (OCP). In response to operator input or other sensing of the code, an electrical signal representing the code is transmitted to the copier's logic and control unit (LCU). The LCU is programmed to signal the tone reproduction control process controller 360 to generate sets of new threshold masks for use in the unified rendering processor 320. Alternatively, these new mask sets may be stored in RAM and can thereby generate for smaller toner particles either screens that are of much higher frequency that are visually equivalent, from a granularity perspective, or are of slightly moderately higher frequency with improved appearance from a granularity perspective. Where different screens are stored, they may be blended together in accordance with the teachings herein to provide improved rendering. It is believed that with smaller particle size toners that more stable dots may be obtained at lower rendered gray levels. Thus, in building a mixed dot structure, toner particle size can be considered in constructing the structures so that in growing a dot at a particular location a dot is allowed to grow until a stable dot is achieved with the electrophotographic process before growing a dot at another location. Where a binary printer is provided there is no need for a set of threshold masks as one threshold mask containing different threshold values, as known in the prior art, may be generated for each screen frequency. Comparison of a raw pixel gray level value with a corresponding value in the threshold mask results in a decision to either print or not print a dot; i.e. a binary 1 or 0 rendering bit is generated. In addition to changing rendering, optimum performance may be had by also modifying, in response to input of the new toner size, various parameters associated with the electrophotographic process. Specifically, because smaller toner particles tend to acquire a higher charge, the voltage bias used for transferring the toner from the photoconductor to the plain paper receiver sheet may need to be adjusted. Other adjustments such as to $V_O$, the uniform charge level on the photoconductor, and the developer roller bias may be made higher. The developer roller may have its gap spacing from the photoconductor also reduced. Adjustments to cleaning of the photoconductor may also be made to overcome tendency of the smaller particles to remain with the photoconductor. Thus, input of toner particle size information to the copier may be used to adjust the rendering process.

The invention has been described in detail with particular reference to preferred embodiments thereof and illustrative examples, but it will be understood that variations and modifications can be effected within the spirit and scope of the invention.

What is claimed:

1. An apparatus for producing an image, comprising:
   means for providing first signals representing gray level unrendered pixel values of an image to be rendered;
   rendering means for rendering the image by comparing the unrendered pixel values with corresponding threshold values associated with one of plural different respective halftone threshold mask sets suitable for rendering different respective image types and generating second signals representing gray level rendering pixel values for the image;
   means responsive to said second signals for producing a gray level reproduction of the image; and
   wherein said rendering means includes blending means for generating, for certain pixels of said image, rendering pixel values that are each in response to operating with threshold values of different respective mask sets.

2. The apparatus of claim 1 and wherein said blending means generates a rendering pixel value that is determined from rendering pixel values using different threshold mask sets operating upon the same unrendered pixel value.

3. The apparatus of claim 2 and wherein said blending means determines blending apportioning parameters for one of said certain pixels based on a local contrast index of the pixel.

4. The apparatus of claim 1 and wherein said blending means generates a rendering pixel value by comparing a blended threshold value generated from threshold values from different respective mask sets with an unrendered pixel value of one of said certain pixels.

5. The apparatus of claim 4 and wherein said blending means determines blending apportioning parameters for said pixel based on a local contrast index of said pixel.

6. The apparatus of claim 1 and wherein one of said threshold mask sets is associated with a mixed dot halftone screen structure.

7. The apparatus of claim 1 and wherein said threshold mask sets comprise two different mixed dot halftone screen structures and wherein one of the halftone screen structures has a weaker screen structure than the other.

8. The apparatus of claim 1 wherein said threshold mask sets include a set with a partial dot halftone screen structure.

9. The apparatus of claim 1 and wherein tone adjusting means adjusts rendering pixel values before producing a gray level reproduction of the image.

10. The apparatus of claim 1 and including network means for combining images from different sources.

11. The apparatus of claim 10 and including mapper means for mapping different images having different bit depths.

12. The apparatus of claim 11 and wherein said different respective threshold mask sets have different bit depth structures.

13. The apparatus of claim 6 and wherein one of said threshold mask sets is associated with a partial dot type gray level growth structure.

14. The apparatus of claim 1 and wherein said means for providing first signals includes a scanner means for scanning and digitizing an image into gray level unrendered pixel values.

15. The apparatus of claim 1 and wherein said blending means determines blending apportioning parameters for a pixel to be rendered based on a local contrast index of the pixel to be rendered.

16. The apparatus of claim 15 and wherein one of said threshold mask sets is associated with a mixed dot halftone screen structure.

17. The apparatus of claim 15 and wherein said threshold mask sets comprise two different mixed dot halftone screen structures and wherein one of the halftone screen structures has a weaker screen structure than the other.

18. The apparatus of claim 1 and including mapper means for mapping different images having different bit depths.

19. The apparatus of claim 1 and wherein said different respective threshold mask sets have different bit depth structures.

20. An apparatus for producing an image, comprising:

image generating means for generating digital signals representing pixels of an image to be produced;

a controller coupled to the image generating means to receive the signals representing the digitized image, and which produces a first signal corresponding to a gray level halftoned representation of the digitized image;

a printer coupled to the controller to receive said first signal and which in response to said first signal produces a gray level halftoned reproduction of the image;

wherein the controller includes means for calculating a local contrast index of a pixel of interest, means including a mask generating means for generating a rendering gray value for the pixel of interest from each of two different halftone screen mask sets; means for blending rendering gray values generated from the two different halftone screen mask sets to generate a blended gray level pixel value for rendering the pixel of interest; and means for outputting said blended gray level pixel value as said first signal.

21. The apparatus of claim 20, wherein the mask generating means generates threshold values from a threshold value mask set associated with a mixed dot halftone screen structure.

22. The apparatus of claim 20, wherein the mask generating means generates threshold values from two different mixed dot halftone screen sets having different structures and wherein one of the halftone screen sets has a weaker screen structure than the other.

23. The apparatus of claim 20 and wherein the mask generating means generates threshold values for a set having a partial dot type gray level growth structure and a set having a fixed dot growth structure.

24. For use with a printer apparatus, a controller for receiving signals representing a digitized image and for outputting digital signals representing gray values for rendering pixels in the original image in accordance with the requirements of a printer, the controller comprising:

means for calculating a local contrast index of a pixel of interest;

means including a mask generating means for generating a rendering gray value for the pixel of interest from each of two different halftone screen masks;

means for blending the rendering gray values generated from the two different halftone screen masks to generate a blended gray level pixel value for rendering the pixel of interest; and means for outputting said blended gray level pixel value for rendering by a printer apparatus.

25. The controller of claim 24, wherein the mask generating means generates threshold values for two different mixed dot halftone screen structures and wherein one of the halftone screens has a weaker screen structure than the other.

26. The controller of claim 24 and wherein the mask generating means generates threshold values for a partial dot type gray level growth structure.

27. A method for producing an image, comprising:

comparing gray level unrendered pixel values of the image with corresponding threshold values associated with one of plural different respective halftone threshold mask sets, the mask sets being suitable for rendering different respective image types, and generating first signals representing gray level rendering pixel values for producing the image;

generating, for certain pixels of said image, second signals representing rendering pixel values that are generated in response to a blending operation involving characteristics of different respective mask sets; and in response to said first and second signals producing a gray level reproduction of the image by forming pixels of at least three different dot sizes or densities.

28. The method of claim 27 and wherein said blending operation generates a rendering pixel value that is determined from rendering pixel values using different threshold mask sets operating upon the same unrendered pixel value.

29. The apparatus of claim 27 and wherein said blending operation generates a rendering pixel value by comparing a blended threshold value generated from threshold values from different respective mask sets with an unrendered pixel value of one of said certain pixels of said image.

30. The method of claim 27 and wherein said blending operation determines blending apportioning parameters for a pixel based on a local contrast index of the pixel.

* * * * *